US009595164B2

(12) United States Patent
Robbins et al.

(10) Patent No.: US 9,595,164 B2
(45) Date of Patent: Mar. 14, 2017

(54) SOCIAL GAMING WEBSITE AND RELATED IN-ADVERTISEMENT GAMING

(71) Applicant: WMS Gaming, Inc., Waukegan, IL (US)

(72) Inventors: Richard B. Robbins, Glenview, IL (US); Travis N. Nelson, Canton, GA (US); Nickey C. Shin, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 209 days.

(21) Appl. No.: 14/279,980

(22) Filed: May 16, 2014

(65) Prior Publication Data

US 2014/0342833 A1 Nov. 20, 2014

Related U.S. Application Data

(60) Provisional application No. 61/824,117, filed on May 16, 2013.

(51) Int. Cl.
*A63F 13/00* (2014.01)
*G07F 17/32* (2006.01)

(52) U.S. Cl.
CPC .................................. *G07F 17/323* (2013.01)

(58) Field of Classification Search
CPC . G07F 17/3227; G07F 17/323; G07F 17/3237
USPC ......................................... 463/16, 20, 31, 42
See application file for complete search history.

(56) References Cited

U.S. PATENT DOCUMENTS

| | | | |
|---|---|---|---|
| 6,009,458 A | 12/1999 | Hawkins et al. | |
| 8,220,019 B2 | 7/2012 | Stearns et al. | |
| 8,371,919 B2 | 2/2013 | Hornik et al. | |
| 8,414,374 B2 | 4/2013 | Pacey et al. | |
| 8,550,920 B1 * | 10/2013 | Allen | G07F 17/3241 463/25 |
| 2002/0155878 A1 | 10/2002 | Lert, Jr. et al. | |
| 2010/0083306 A1 | 4/2010 | Dempski et al. | |

(Continued)

FOREIGN PATENT DOCUMENTS

| | | |
|---|---|---|
| WO | WO-0024484 | 5/2000 |
| WO | WO-2007149790 | 12/2007 |

*Primary Examiner* — James S McClellan
(74) *Attorney, Agent, or Firm* — DeLizio Law, PLLC

(57) ABSTRACT

A method for persistent casino-style gameplay is described herein. In some embodiments, the operations can include presenting, a gaming session to a user, wherein the gaming session includes casino-style games and is associated with a user profile. The operations can also include recording information about the casino-style games during the gaming session. The operations can also include detecting a request for an in-advertisement casino-style game, wherein the in-advertisement casino-style game will appear on a webpage. The operations can also include transmitting for presentation on the webpage as part of the in-advertisement casino-style game, first content configured to receive information identifying the user. The operations can also include receiving the information identifying the user profile. The operations can also include transmitting for presentation on the webpage as part of the in-advertisement casino-style game, second content including data to resume play of the gaming session via the in-advertisement casino-style game.

26 Claims, 10 Drawing Sheets

(56) References Cited

U.S. PATENT DOCUMENTS

| | | | | |
|---|---|---|---|---|
| 2011/0218044 | A1* | 9/2011 | Joshi | G06Q 30/0257 463/37 |
| 2012/0015711 | A1 | 1/2012 | Belisle | |
| 2013/0073473 | A1* | 3/2013 | Heath | G06Q 30/02 705/319 |
| 2013/0203489 | A1 | 8/2013 | Lyons | |
| 2013/0311269 | A1 | 11/2013 | Forte | |

* cited by examiner

SOCIAL GAMING WEBSITE AND RELATED IN-ADVERTISEMENT GAMING

RELATED APPLICATIONS

This application claims the priority benefit of U.S. provisional Application Ser. No. 61/824,117 filed May 16, 2013.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to casino-style games, and more particularly to casino-style games with persistent play across a plurality of webpages and/or websites.

BACKGROUND

Some websites offer a social networking environment in which users can play casino-style games. Such websites may offer casino-style games upon which players wager money, and non-wagering versions of those games. Social gaming environments enable users to make friends, share common interests, play community games, and otherwise interact. However, because the Internet offers a variety of content, users may leave game-related social networking sites, seeking other content, such as news and other media. After leaving social gaming websites, users may receive advertisements, which can encourage them to visit various websites, purchase products via the internet, etc.

On the internet, targeted advertising is an effective mechanism for marketing products and services, and otherwise influencing users. Before targeted advertising, advertisers had limited ability to reach an audience interested in their products or services. For example, a company selling football equipment could choose to place advertisements on websites relating to sports and athletics (e.g., ESPN.com). While this is likely more effective than placing advertisements arbitrarily on websites having a variety of themes, there was no assurance that visitors of websites relating to sports and athletics had any interesting purchasing football equipment. For example, many of ESPN.com's visitors are likely adults that enjoy watching televised sporting events, but may not themselves participate in sporting events (let alone football). Such visitors may be unlikely to have interest in a company selling football equipment. With current technology, the online behavior can be tracked. For example, when a user browses the internet, files can be created and saved, logging what websites the user visited, which items the user clicked on or hovered over while on the websites, search queries that the user has entered, times that the user visited websites, how long the user stayed on each website and each webpage, etc. With such technology, advertisers have a greater ability to reach an audience interested in their services or products. For example, the same company selling football equipment can serve advertisements to individuals that in the past, have viewed sporting goods store websites, entered search queries relating to football equipment, clicked on links or other material related to football equipment, etc. Based on the historical data associated with the user's online activity, advertisers can presume that the user may be interested in purchasing football equipment. Typically, when a user visits a webpage, the webpage queries the user's computer to determine if the user has previously visited the website. If the user has not previously visited the website, the website may create a data file containing information identifying the user, and possibly the user's activity while on the website, and store the file on the user's computer (e.g., drop a cookie on the user's hard disk). If the user has previously visited the website, the website updates the information in the data file, logging the user's current visit. When multiple websites are members of the same ad network, the ad network can access the user's browsing information stored by the websites. This enables ad networks to serve webpage advertisements that are based on the user's browsing information. In other words, when a new webpage or website is visited, the ad network serves a new advertisement for the user to view that corresponds to the user's browsing history.

BRIEF DESCRIPTION OF THE FIGURES

Embodiments of the invention are illustrated in the Figures of the accompanying drawings in which.

DESCRIPTION OF THE EMBODIMENTS

Introduction

This section provides an introduction to some embodiments of the invention.

As social gaming website users browse away from the social gaming website, some embodiments provide ways for extending the users' gaming experiences outside the social gaming website. In some instances, embodiments can present ads on other websites, where the ads relate to games offered on the social gaming website. The ads may enable users to continue games they were playing on the social gaming website. Also, the ads may provide functionality available on the user's profile in the social casino website (or a portion of the profile functionality). That is, an ad may provide any suitable option/function available in the user's social casino (e.g., the user's profile on the social casino website). For example, if a user has a particular set of games available via the social casino website, those games may be available in the advertisement. In other instances, embodiments entice new users to play in-ad games that reward users for signing-on to the social gaming website, such as to claim a prize from the in-ad game. The discussion of FIGS. 1A and 1B describe some embodiments in more detail.

Figure 1A:
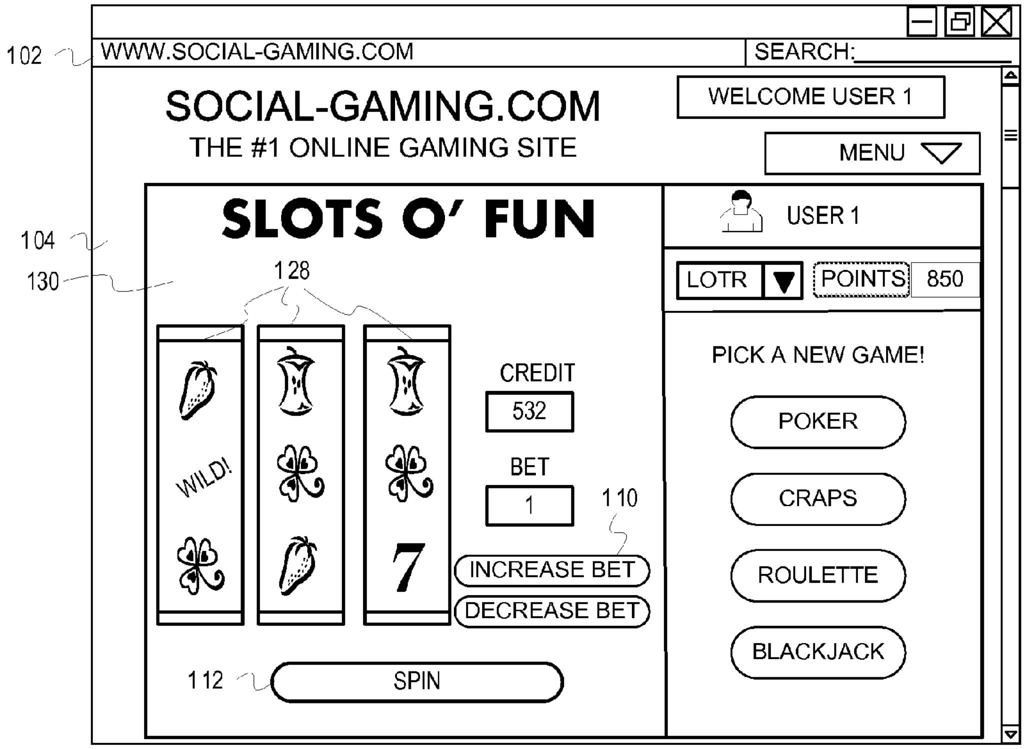
FIG. 1A depicts a first webpage 104 associated with a social gaming website 102, on which users can play virtual casino-style games.

FIG. 1A depicts a first webpage 104 associated with a social gaming website 102 on which users can play video casino-style games. As depicted in FIG. 1A, a user (User 1) is accessing a social gaming website 102 "www.socialgaming.com." The social gaming website 102 can be any website suitable for casino-style game play. For example, the social gaming website 102 can be a website hosting only casino-style games on which players can wager monetary or non-monetary value. In some instances, the social gaming website 102 can be a dedicated casino-style gaming website that also has social aspects. For example, the social gaming website 102 can include casino-style games, as well user groups, discussion forums, user provided content, etc. In some embodiments, the social gaming website 102 can be a social networking website offering applications for playing casino-style games. For example, an extension to the social networking website can be a social casino. In some embodiments, the user logs into (e.g., provides a user identifier and password) the social gaming website 102. After login, the user can engage in a variety of casino-style games. For example, the user can play slots games, card games, dice games, etc. In various embodiments, the user can wager money, points, or other value on the casino-style games to win money, points, prizes, etc. Additionally, in some embodiments, the user can engage in activities apart from gaming, such as chatting with friends, creating a user profile, etc. As depicted in FIG. 1A, the user is playing a slots game 130. The casino-style game can be presented using any suitable rendering technology (e.g., HTML 5, Flash, etc.). The slots game contains the elements typically associated with a video slots game, such as slot reels 128, bet increase/decrease buttons 110, a spin button 112, etc. As the user plays the slots game, the user can win prizes, advance to new levels, unlock new games, etc. The user's progress as the user plays the slots game (or any other game played) is recorded. In other words, the user's progress in the slots game is stored so that the game can be later resumed where the user left off. For example, the website may store: 1) badges indicating a player's various achievements in poker games (e.g., royal flush badge); 2) a player's progress through thematic episodes of a game; 3) credit meters associated with particular gaming sessions; 4) game levels the player has unlocked; 5) games available to the player; 6) virtual currency earned, 7) etc. Because the social gaming website can store such information, it can restore game states, game themes, etc. when players return to the social gaming website, or when they play in-ad games, as described below.

Figure 1B:
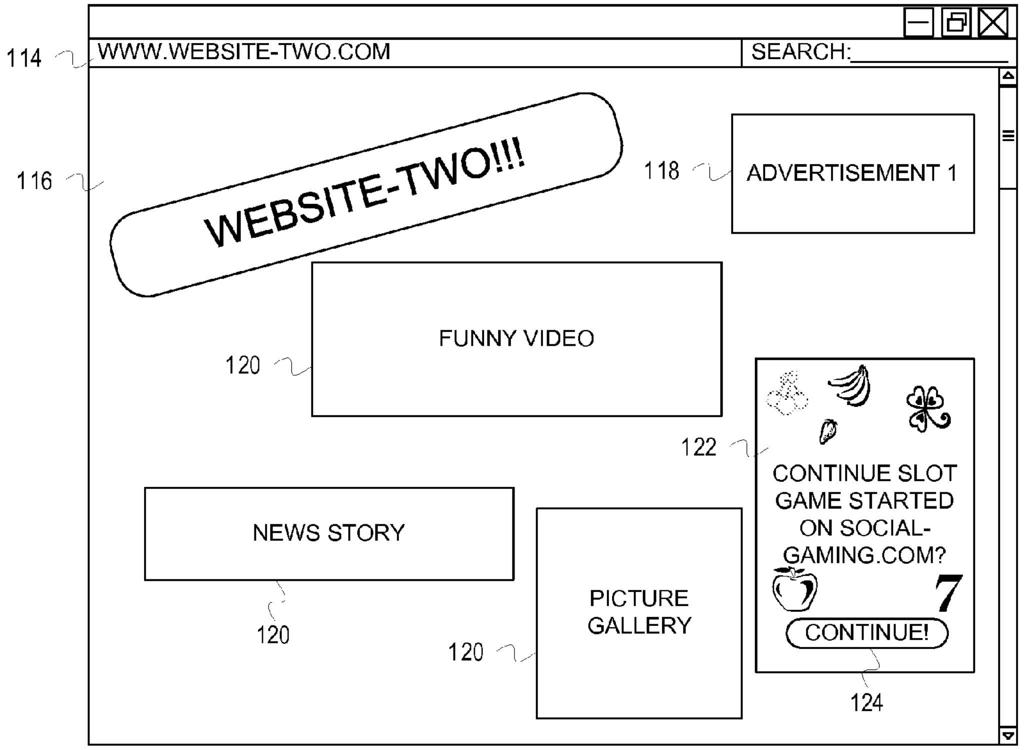
FIG. 1B depicts a second webpage 114 associated with a second website 112 presenting an in-ad game 122 that is a continuation of the casino-style game played by the user on the social gaming website depicted in FIG. 1A.

FIG. 1B depicts a second webpage 116 associated with a second website 114 presenting an in-ad game 122 that is a continuation of the casino-style game played by the user on the social gaming website depicted in FIG. 1A. The second webpage 116 contains web elements 120, a first advertisement 118 and a second advertisement 122. The first advertisement 118 is a generic advertisement. The second advertisement 122 is an in-ad game. The in-ad game can be presented using any suitable rendering technology (e.g., HTML 5, Flash, etc.). In some embodiments, the user is prompted to login to the social gaming website via the in-ad game using his/her social gaming credentials. Once the user has logged in, the second webpage 116 presents the in-ad game containing the slots game that the user was playing on the social gaming website (i.e., the game shown in FIG. 1A).

In some embodiments, the user can continue a gaming session in the in-ad game, where the gaming session started on the social gaming website. In some instances, all aspects of the gaming session are available on the in-ad game, such as badges, available games, episodic progress, credit meters, state of an unfinished game, etc. In other instances, less than all aspects of the gaming session are available in the in-ad game. In some embodiments, continuing a game (whether an in-ad game or a game on a social gaming website) can be more than resuming a game where the user left off. Continuing a game can refer to the entire game experience including functionality of a social casino on the social gaming website. That is, continuing a game can be allowing continued access to the functionality, features, options, etc. of the user's social casino.

In some embodiments, the user can have access to any game available to the user on the social gaming website. In such embodiments, the user can select from the available games, or can be prompted to continue a specific game using continue button 124. When the user chooses to continue the slots game played on the social gaming website, the in-ad game contains the slots game from the social gaming website in the game state in which the player left off. The game state can include the user's credit meter balance, the user's predefined settings for the casino-style came, any awards the player has won on the social gaming website, any games or levels unlocked by the player on the social gaming website, etc. In other words, the user can play casino-style games and access all content available on the social gaming website through the in-ad game 122.

In some embodiments, these operations can also occur in reverse order. For example, when a user visits a webpage containing an in-ad game, the user can login to the social gaming website via the in-ad game and play casino-style games via the in-ad game. The user's progress is also tracked via the in-ad game. This tracking allows the player to resume the game on the social gaming website, subsequent in-ad game, etc. where he/she left off. Additionally, any awards, bonus, levels, prizes, etc. won by the user are recorded so that the user can later access these items on the social gaming website, subsequent in-ad game, etc. In some embodiments, the in-ad game can also contain a link to the social gaming website so that the user may more easily continue play of the casino-style game on the social gaming website.

According to some embodiments, in-ad games can be casino-style wagering games, casino-style games on which virtual or other value is wagered, casino-style games for which no value is wagered but value can be won, or any other suitable games on which value can be wagered and/or won. In some embodiments the value can be coupons, virtual currency, goods, services, money, etc. In some embodiments, users can win and/or lose money playing in-ad games.

Figure 2:
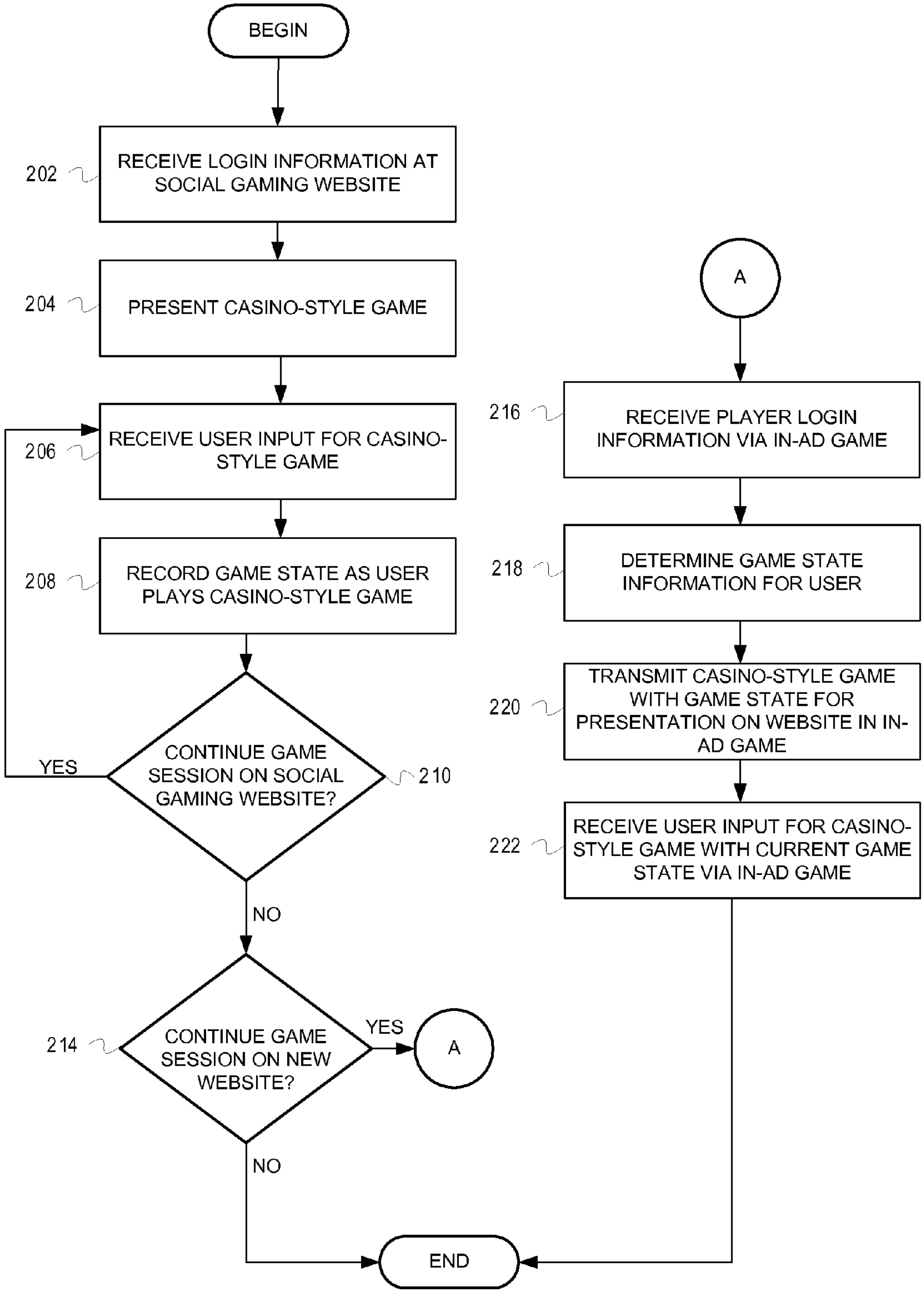
FIG. 2 is a flow diagram illustrating example operations for persistent play of a casino-style game between a social gaming website and an in-ad game of a second website.

While FIGS. 1A and 1B describe persistent play of casino-style games between a social gaming website and an in-ad game on a second webpage or website, FIG. 2 describes example operations for persistent play of casino-style games between a social gaming website and an in-ad game on a second webpage or website.

Discussion of Embodiments

FIG. 2 is a flow diagram illustrating example operations for persistent play of a casino-style game between a social gaming website and an in-ad game of a second website. The flow begins at block 202.

At block 202, a web server associated with a social gaming website receives login information from a user. In some embodiments, the social gaming website is a social networking website on which users can play casino-style games. In other words, casino-style games may only be one aspect of the social gaming website. The flow continues at block 204.

At block 204, the social gaming website presents a casino-style game. The casino-style game can be any suitable game, such a craps and other dice games, poker and other card games, roulette, etc. In some embodiments, users can wager money on the casino-style games. Alternatively, in some embodiments, users wager something other than currency on the casino-style games (e.g., points). In some instances, the social gaming website offers non-wagering versions (a.k.a. play-for-fun versions) of the casino-style games. The flow continues at block 206.

At block 206, the social gaming website receives user input for the casino-style game. Such user input can be input to play the casino-style game. For example, the user input can comprise spinning slot reels, placing bets, dealing cards, etc. The flow continues at block 208.

At block 208, the social gaming website records game state information of the casino-style game as the user plays the casino-style game. The game state information includes all information necessary for resuming play of the casino-style game at a subsequent time. In other words, the recorded game state information allows the user to play the casino-style game at one point in time, then at a subsequent point time, resume play of the casino-style game where he/she left off. For example, the game state information can include trophies earned, levels unlocked, credits earned, content unlocked, game elements unlocked, etc. As an additional example with a card game, when a player leaves a card game during play of a hand, the current cards that comprise the user's and other players' hands can be recorded as game state information. In some embodiments, the social gaming website records the game state information continuously as the user plays the casino-style game. In other embodiments, the social gaming website can record the game state information at varying intervals. For example, the social gaming website can record the game state information every minute, after every hand/spin/etc., when the user ceases playing the casino-style game, etc. The flow continues at decision diamond 210.

At decision diamond 210, the social gaming website determines if the user is continuing to play the casino-style game on the social gaming website. For example, when the user chooses to deal another hand, the user is choosing to continue playing the casino-style game on the social gaming website. If the user is continuing to play the casino-style game on the social gaming website, the flow continues at block 206. If the user has chosen not to continue play of the casino-style game on the social gaming website, the flow continues at decision diamond 214.

As discussed above, players may browse away for a social gaming website, seeking other content, such as news, media, or other information. The remainder of the flow 200 shows how embodiments can enable users to continue their gaming experiences after they leave the social gaming website. Some embodiments enable players to continue their gaming experience by presenting advertisements which include games from the social gaming website (a.k.a. in-ad games). This following discussion continues at block 214, and describes how embodiments enable users to continue their gaming experiences after they leave the social gaming website.

At decision diamond 214, the social gaming website determines if the user is to continue the game session (i.e., playing the casino-style game) on a new website. If the user has logged out or otherwise exited the social gaming website and is not resuming the casino-style game elsewhere, the flow ends. If the user has navigated to a new webpage or website and wishes to continue playing the casino-style game, the flow continues at block 216. The user need not immediately browse to an in-ad game to continue his/her gaming experience. For example, on a first day, the user can play the casino-style game on the social gaming website. On a subsequent day, when the user is browsing the Internet, a webpage can present an in-ad game associated with the social gaming website. The user can resume play of any casino-style game associated with the social gaming website as an in-ad game. In other words, it is not necessary that user proceed directly from the social gaming website to an in-ad game to continue play of the casino style game.

At block 216, the web server associated with the social gaming website receives player login information via the in-ad game. For example, after the new website (i.e., a website other than the social gaming website) presents the in-ad game, the in-ad game can prompt the user to login using his/her social gaming website credentials. The in-ad game can forward the login information to the social gaming website, where the login information is received at block 216. The flow continues at block 218.

At block 218, the web server associated with the social gaming website determines the game state information for the user. In other words, once the user has logged into the social gaming website via the in-ad game, the web server can access all information associated with the user pertaining to the social gaming website. This information includes all data necessary for persistent play of casino-style games across the social gaming website and the in-ad game on the second website. The game state information can include state of unfinished games, listing of available games, the user's progress through an episodic game, badges and achievements, and any other information for continuing game experiences from the social gaming website. Some embodiments enable the user to have access to all features of the social gaming website (e.g., virtual lobbies, chat rooms, casino-style games, etc.) through the in-ad game. The flow continues at block 220.

At block 220, the web server associated with the social gaming website transmits game state information and content for continuing a game experience in the in-ad game. The user can continue a gaming experience in the in-ad game from where he/she previously left off at the social gaming website. The flow continues at block 222.

At block 222, the web server associated with the social gaming website receives user input for the casino-style game with the current game state information via the in-ad game. In other words, the user continues playing the casino-style game via the in-ad game where he/she previously left off. When the user no longer wishes to play the casino-style game via the in-ad game, the flow ends.

It should be noted that the operations depicted in FIG. 2 can proceed in varying orders to permit persistent play of a casino-style game from an in-ad game to the social gaming website. In other words, although FIG. 2 describes a user playing a casino-style game on a social gaming website, then subsequently resuming the casino-style game on another webpage or website as an in-ad game, in some embodiments, the user can begin/continue play of a casino-style game as an in-ad game on a webpage, then subsequently continue the casino-style game on the social gaming website. In essence, the game state information associated with the user and the casino-style game allows the user to resume play of the casino-style game as an in-ad game between multiple webpages and websites, and also between the social gaming website and the multiple webpages and websites as an in-ad game.

This discussion will now describe more details about in-ad games.

Figure 3A:
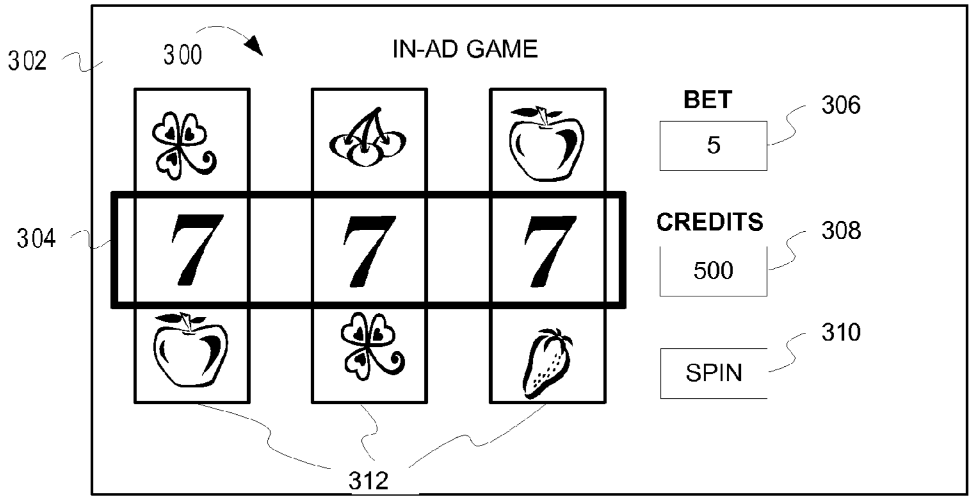
FIGS. 3A-3C depict progression of a casino-style game presented in an in-ad game.
Figure 3B:
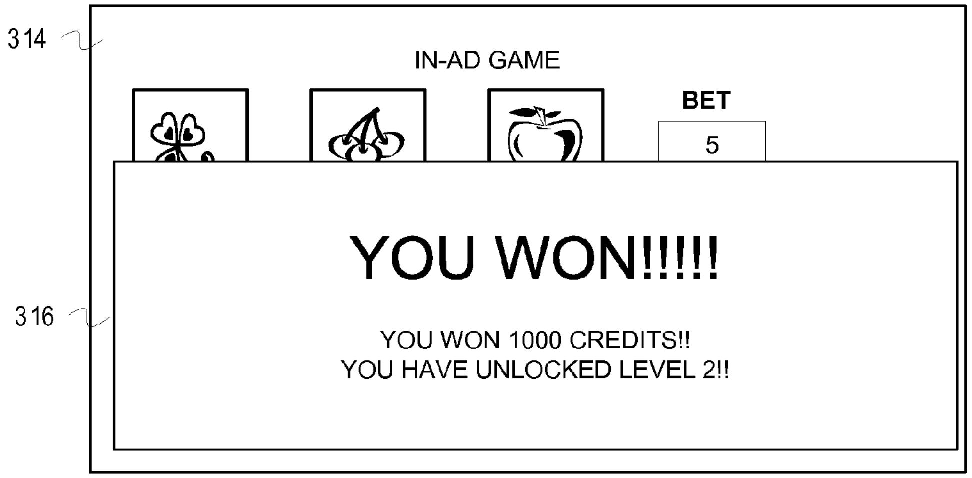
Figure 3C:

FIGS. 3A-3C depict progression of a casino-style game presented in an in-ad game. FIG. 3A depicts an in-ad game 302 containing a casino style game 300. The casino-style game 300 depicted in FIG. 3A is a slots game, which includes slot reels 312, bet indicator 306, credit meter 308, and spin button 310. In FIG. 3A, a user has played the casino-style game 300, resulting in a winning outcome of three "7s," as indicated by box 304. Because the user has obtained a winning outcome, the in-ad game 314 presents an award message 316, as depicted in FIG. 3B. As depicted in FIG. 3B, the user has won 1,000 credits and unlocked level two as an award for the winning result depicted in FIG. 3A. Next, the in-ad game 318 presents a login message 320, as depicted in FIG. 3C. In some embodiments, the user is required to login to the social gaming website to save the award obtained from the in-ad game and save the game state of the casino-style game. If the user is not a member of the social gaming website, the user can be prompted create an account with the social gaming website and become a member. When the player logs into using his/her social gaming website credentials, the game state information associated with the casino-style game is saved and associated with the user's account.

Figure 4A:
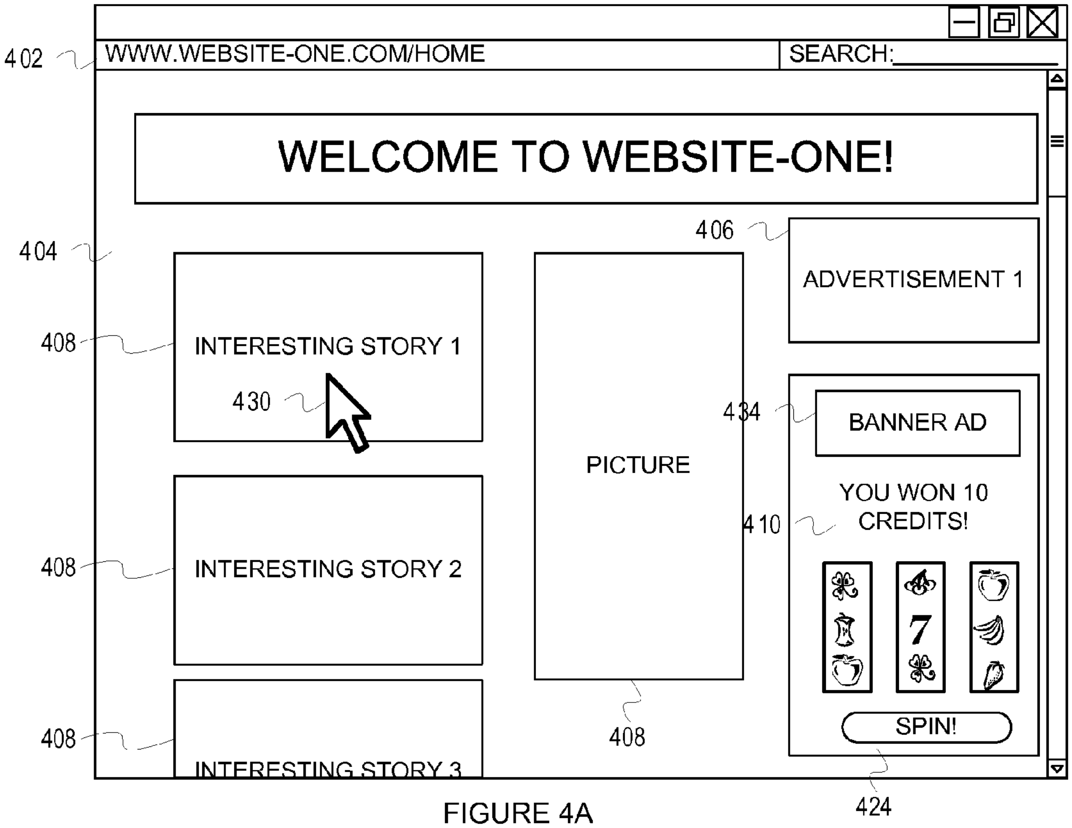
FIG. 4A depicts play of an in-ad game 410 on a first webpage 404 associated with a website 402.
Figure 4B:
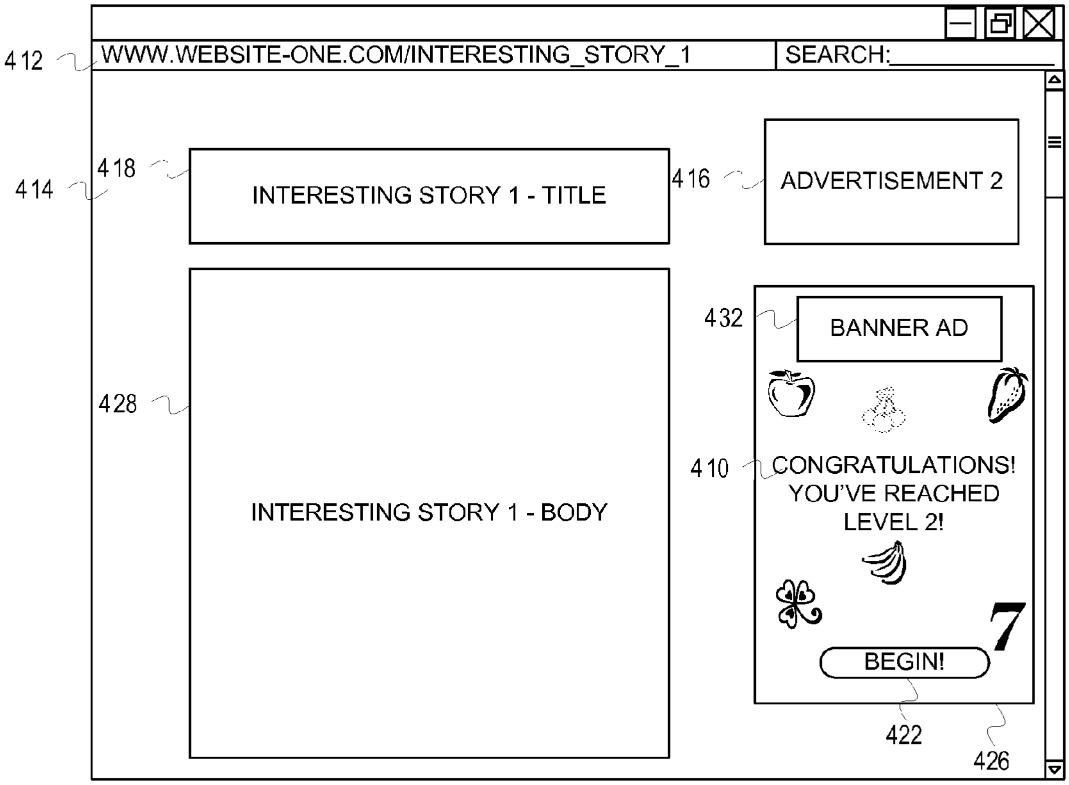
FIG. 4B depicts continued progression of an in-ad game 420 on a second webpage 414 associated with the website 412 as the player navigates about the website 412.
Figure 5:
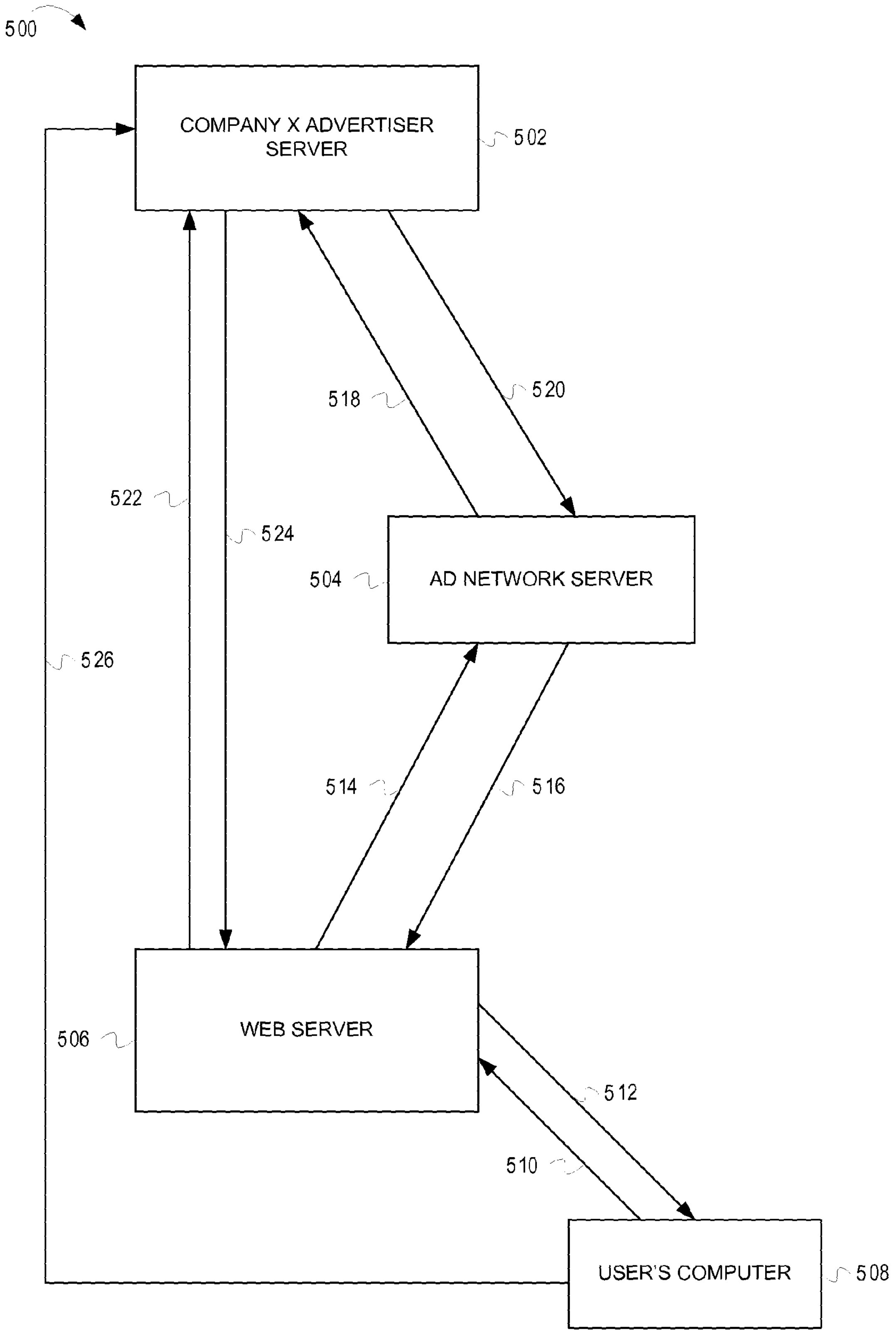
FIG. 5 is a block diagram depicting example communications of an ad network system 500.
Figure 6:
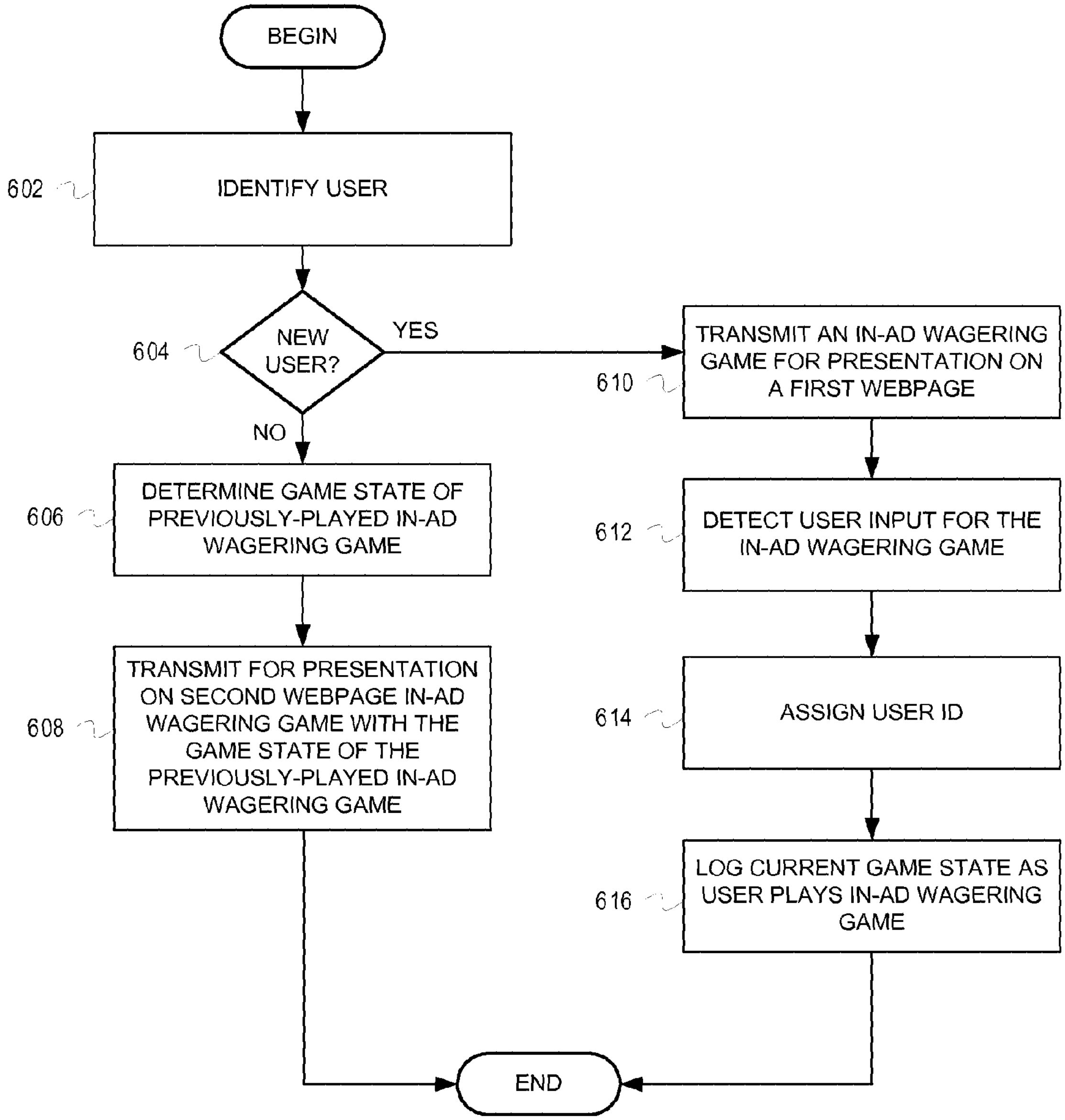
FIG. 6 is a flow diagram illustrating example operations for an advertiser server facilitating continued presentation of an in-ad game between webpages.

While FIGS. 1-3 describe persistent play of a casino-style game between a social gaming website and a second website via an in-ad game, FIGS. 4-6 describe persistent play of in-ad games between a first webpage/website and a second webpage/website.

FIG. 4A depicts play of an in-ad game 410 on a first webpage 404 associated with a website 402. As depicted in FIG. 4A, a user is browsing the first webpage 404 (the home screen for the website 402). The first webpage 404 contains web elements 408 and two advertisements 406 and 424. The first advertisement, "Advertisement 1," 406 is a generic advertisement displayed on the first webpage 404. The second advertisement 424 is an in-ad game 410. The in-ad game 410 also contains a nested banner ad 434. In some embodiments, the nested banner ad 434 can be an advertisement associated with a sponsor of the in-ad game 410. For example, a beverage company can advertise their product with a nested banner ad. As depicted, the user has won 10 credits playing the in-ad game 410. Subsequently, the player accesses content from the website 402 by selecting 430 the web element 408 associated with "Interesting Story 1." After selecting 430 the web element 408, the website 402 redirects the player to a second webpage 414 associated with "Interesting Story 1," as depicted in FIG. 4B. Some embodiments enable the user to continue the in-ad gaming experience after browsing to another web page, as described in FIG. 4B.

FIG. 4B depicts continued progression of an in-ad game 410 on a second webpage 414 associated with the website (www.website-one.com), as the player navigates about the website 412. The second webpage 414 includes the title text 418 of "Interesting Story 1," the body text 428 of "Interesting Story 1," a generic advertisement 416, and the in-ad game 410. Because the player won 10 credits playing the in-ad game 410 (on FIG. 4A), the player has gained access to Level 2 of the in-ad game 410. The in-ad game 410 is a continuation of the in-ad game 410 depicted in FIG. 4A, and the player's progress persists as the player navigates from one webpage to the next. Additionally, the in-ad game 410 contains a nested banner ad 432, which can persist as the user plays the in-ad game 410. That is, the nested banner ad may remain constant as the user plays the in-ad game 410, and then navigates to the in-ad game 420 on a different webpage. Alternatively, the nested banner ad 432 can change as the user plays the in-ad game 410 or navigates from one webpage/website to the next. For example, in some embodiments, when the user navigates to a new webpage or website, the in-ad game 410 persists in its current game state, but the nested banner ad 434 changes. Additionally, in some embodiments, the banner ad 434 can change based on a predetermined number of plays of the in-ad game 410. For example. Every fifth spin of the slot reels, fifth hand dealt, etc. can cause the nested banner ad 732 to change. In some embodiments, when a user begins a casino-style game in an in-ad game on a website, the user is prompted to login to a social gaming website via the in-ad game. In such embodiments, if the user is not a member of the social gaming website, the user is prompted to become a member of the social gaming website. When the user logs into the social gaming website via the in-ad game, the game state information of the casino-style game is saved and associated with the user's account. In some embodiments, this allows users to resume play of the casino-style game on the social gaming website.

This discussion will continue by describing how embodiments include webservers, advertiser network servers, and advertiser servers that work together to provide targeted advertisements. More specifically, the discussion of FIG. 5 will show how the various servers interact to present targeted advertisements.

FIG. 5 is a block diagram depicting example communications of an ad network system 500. FIG. 5 shows some components of the ad network system 500, including Company X advertiser server 502, an ad network server 504, a web server 506, and a user's computer 508. In this discussion, the terms "user" and "user's computer" will be used interchangeably. In other words, although a user (i.e., a person) may enter a uniform resource locator (URL) or IP address in order to access a webpage, the discussion may refer to the user's computer as accessing the webpage.

In FIG. 5, the user's computer 508 can use a web browser to navigate to a webpage available on the web server 506. In navigating to the webpage, the user's computer 508 transmits a request 510 for content associated with the webpage. The request 510 can include tracking information (e.g., indicating that the user has previously accessed the webpage). For example, if the user has previously accessed the webpage, the user's computer 508 can transmit 510 any tracking information (e.g., a cookie) stored on the user's computer 508 to the web server 506. If the user has not previously accessed the webpage, the web server 512 can assign the user a unique identifier and transmit 512 tracking information to the user's computer 508 (e.g., drop a cookie on the user's computer 508).

After receiving the user's webpage request, the web server 506 sends a redirect 514 to an the ad network server 504 requesting an advertisement to present on the webpage. This redirect can include tracking information about the user. Additionally, in some embodiments, the ad network server 504 can receive tracking information from a plurality of other web servers (not shown) to build a richer profile of the user. The ad network server 504, using the tracking information received from the web server 506 (and possibly other web servers—not shown), determines an advertiser (or advertisement) appropriate for the user. Upon determining that Company X is an appropriate advertiser for the user, the ad network server 504 sends a request 518 to Company X advertiser server 502. In some embodiments, the request 518 can include an indication of the web server to which the advertisement should be delivered. In such embodiments, upon receiving the request 518, Company X advertiser server delivers 524 an advertisement to the web server 506. The web server 506 composites the advertisement within the webpage, and delivers 512 the webpage composited with the advertisement to the user's computer 508. In other embodiments, Company X advertiser server 502 can deliver 520 an advertisement to the ad network server 504, as opposed to delivering the advertisement to the web server 506. The ad network server then transmits 516 the advertisement to the web server 506. The web server 506 composites the advertisement within the webpage, and delivers 512 the webpage composited with the advertisement to the user's computer 508.

In some embodiments, an in-ad game is delivered to the user's computer 508. When the user interacts with the in-ad game, the interaction is transmitted 526 to Company X advertiser server 502. Company X advertiser server 502 can identify the player (as previously discussed). Additionally, Company X advertiser server 502 can record the game state of the in-ad game. With this information, when the user navigates to a new webpage or website, Company X advertiser server 502 can transmit 524 to the web server 506 the in-ad game initially played by the user at current game state where the user left off.

Additionally, embodiments can operate in a manner other than those shown in FIG. 5. In some embodiments, the user's computer interacts directly with each of the servers. For example, the user's computer can interact directly with the webserver by requesting web content from the web server. The web server can then provide the user's computer with the web content as well as an indication of an address of an ad network server. The user's computer can then proceed to the address of the ad network server to request advertising content. The ad network server can analyze information about the user (e.g., using cookies) and determine an appropriate company advertiser server for the user. The ad network server can then transmit an indication of an address of the company advertiser server to the user's computer. The user's computer can then proceed to the address of the company advertiser server to request the advertising content from the company advertiser server. The company advertiser server can then transmit the advertising content to the user's computer. In some embodiments, the company advertiser server can also analyze information about the user to select a specific advertisement for the user. When the user's computer receives the advertising content from the company advertiser server, the user's computer displays the web content received from the web server composited with the advertising content from the company advertiser server. It should be noted that many systems are possible, and those listed are given only by way of illustration.

While FIG. 5 describes communication of an example ad network, FIG. 6 describes example operations for persistent play of a casino-style game as an in-ad game between a first website/webpage and a second website/webpage.

FIG. 6 is a flow diagram illustrating example operations for an advertiser server facilitating continued presentation of an in-ad game between webpages. The operations show how advertiser servers can provide a continuous targeted advertisement to a single user, as the user browses to multiple websites. For example, the operations show how embodiments of the advertiser server can present the user with an in-ad slots game at a first website (e.g., a news website), and a continuation of the in-ad slots game when the user browses to a second website (e.g., a retail website).

The operations relate to the advertiser server, and begin at block 602. In some embodiments, FIG. 6 is part of a larger dialogue between a user's computer and other servers (see discussion of FIG. 5). In any case, at block 602, an advertiser server identifies a user. Such identification can be performed via any suitable means. For example, if the user has previously played an in-ad game associated with the advertiser server, the advertiser server can identify the user based on a user ID assigned to the user during the previous in-ad game gameplay. The advertiser server can also identify the user using an IP address, MAC address, etc. In some embodiments, the user can be prompted to login through the in-ad game. For example, the user can be prompted to login using social network credentials, online casino credentials, etc. In such embodiments, the user may be identified by his/her login credentials. The flow continues at decision diamond 604.

At decision diamond 604, the advertiser server determines if the user is a new user (i.e., the user has not previously played an in-ad game associated with the advertiser server). For example, if the user has a user ID, the advertiser server can determine that the user is not a new user. If the user is not a new user, the flow continues at block 606. If the user is a new user, the flow continues at block 610.

At block 610, the advertiser server transmits an in-ad game for presentation on a first webpage. In some embodiments, the advertiser server can analyze information about the user to select an in-ad game matching the user's interests, as will be discussed in more detail below. The flow continues at block 612.

At block 612, the advertiser server detects user input for the in-ad game. That is, the advertiser server determines that the user is playing the in-ad game. For example, if the casino-style game of the in-ad game is a slot type game, the advertiser server can detect user input to place a bet, spin the slot reels, etc. If the casino-style game of the in-ad game is a card game, the advertiser server can detect user input to place a bet, deal cards, etc. The flow continues at block 614.

At block 614, the advertiser server assigns the user a user ID. For example, because the new user is playing the in-ad game, the advertiser server assigns the new user a unique identifier. In some embodiments, the advertiser server stores the unique identifiers in a database. In other embodiments, the advertiser server can store a user's ID (or other identifying information) in a data file (e.g., cookie) on the user's computer. The flow continues at block 616.

At block 616, the advertiser server logs current game state of the in-ad game as the user plays the in-ad game. In some embodiments, the advertiser server only records game state at the time the user navigates to a new website or webpage. In other embodiments, the advertiser server records all player input for the in-ad game. For example, the advertiser server can record the user's progress as the user plays the in-ad game. In some embodiments, game state can include intermediate in-ad game results, final in-ad game results, user input for the in-ad game, and other information necessary for recreating and/or resuming the in-ad game. In some embodiments, the advertiser server can store game state information on the user's computer. In other embodiments, the advertiser server can store the game state information in a database. Such database can also include the unique identifiers of each user. From block 616, the flow ends.

As previously discussed, if the advertiser server determines that the user is not a new user at decision diamond 604, the flow continues at block 606. At block 606, the advertiser server determines a game state of a previously-played in-ad game. For example, the advertiser server can utilize the user's user ID and previously stored game state information to determine the progress the user had previously made in the in-ad game. Such determination can allow for a persistent in-ad game experience across both webpages and/or websites. The flow continues at block 608.

At block 608, the advertiser server transmits the in-ad game with the game state of the previously-played in-ad game for presentation on a second webpage. In other words, the advertiser server transmits the in-ad game for presentation on the second webpage so that the user can continue play of the in-ad game where he/she left off. From block 608, the flow ends.

Figure 7:
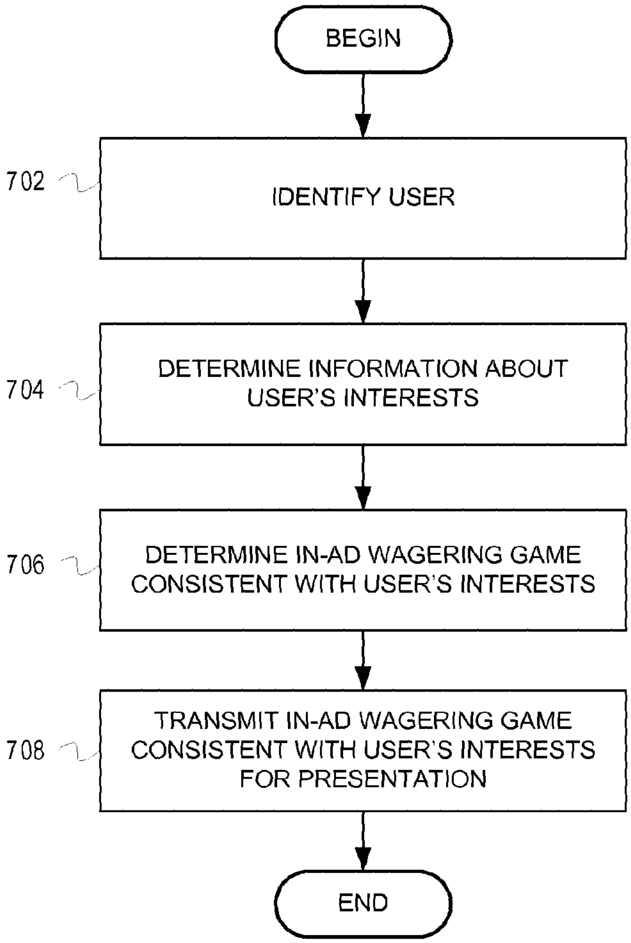
FIG. 7 is a flow diagram illustrating example operations for presenting an in-ad game that is consistent with a player's interests, according to some embodiments of the inventive subject matter.

While FIGS. 4 and 6 describe continuity of play of an in-ad game between multiple webpages or websites, FIG. 7 describes selection of an in-ad game and game award consistent with a user's interests.

FIG. 7 is a flow diagram illustrating example operations for presenting an in-ad game that is consistent with a player's interests, according to some embodiments of the inventive subject matter. The flow begins at block 702.

At block 702, the advertiser server identifies the user. The advertiser server can identify the user by any suitable means. For example, the advertiser server can identify a user based on a user ID assigned to the user by a website (e.g., a cookie), an ad network server, the advertiser server, etc. Additionally, the advertiser sever can identify the user by his/her IP address, MAC address, geographic location, etc. The flow continues at block 704.

At block 704, the advertiser server determines information about the user's interests. This determination can be made based on demographic information about the user, the user's browsing history, etc. For example, the user can be determined to be a female between the ages of 20 and 25, with browsing history including wedding-themed websites, search queries relating to wedding dresses, and a geographic location of Chicago, Ill. The flow continues at block 706.

At block 706, the advertiser server determines an in-ad game consistent with the user's interests. Some users may want to play casino-style slots games, whereas other users prefer casino-style card games. In some embodiments, the advertiser server can select an in-ad game award that the user might be interested in winning. In the example discussed above, the advertiser server can select an in-ad game with a potential prize of a gift certificate to a wedding boutique in Chicago. In some embodiments, the award may not be associated with the specific in-ad game. Rather, an in-ad game may include the same casino-style game, and the potential award won is chosen based on the user's interests. For example, a 55 to 60 year old male living in Nebraska may play the same casino-style game as the 20 to 25 year old female in Chicago, but the award upon winning can be something more likely suited to a 55 to 60 year old male living in Nebraska than a gift certificate for a wedding boutique in Chicago. In some embodiments, the advertiser server can chose an in-ad game that has a theme consistent with the user's interests. For example, the advertiser server can choose a football themed in-ad game for a user that has frequented football themed websites. Additionally, the advertiser server can choose the type of casino-style game contained in the in-ad game based on the information about the user's interests. For example, the information about the user's interests may indicate that the user frequents an online gaming website, and while at the website, plays video poker. Accordingly, the advertiser server can select an in-ad game containing a video poker game. The flow continues at block 708.

At block 708, the advertiser server transmits the in-ad game that is consistent with the user's interests for presentation. In some embodiments, the advertising server transmits the in-ad game directly to a user for presentation of a webpage rendered on the user's browser. In other embodiments, the advertiser server transmits the advertisement containing the in-ad game to another component to be forwarded along for eventual presentation as a webpage on the user's browser.

In some embodiments, the operations of FIG. 7 can be integrated into those shown in FIG. 6. While FIG. 7 describes selection of an in-ad game consistent with a user's interests, FIGS. 8A, 8B, and 9 describe modifying an in-ad game to include content related to an advertiser.

Figure 8A:
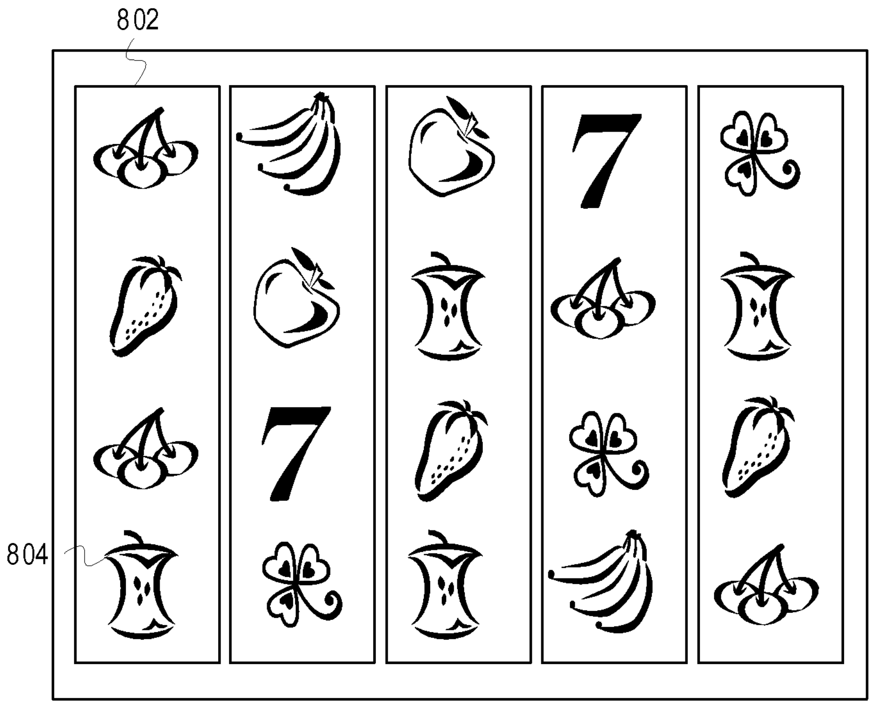
FIG. 8A depicts a portion of an example slot type wagering game.

FIG. 8A depicts a portion of an example slot type wagering game. As depicted in FIG. 8A, the slot type wagering game includes slot reels 802 and slot reel symbols 804. This slot type wagering game is similar to any slot type wagering game found in a physical or virtual casino. This slot type wagering game can be presented as an in-ad game. In other words, an advertisement on a webpage can include the slot type wagering game. For example, an advertisement can be an iframe, and the iframe can contain the in-ad game. A user can interact with the in-ad game just as a user would any virtual casino-style game.

Figure 8B:
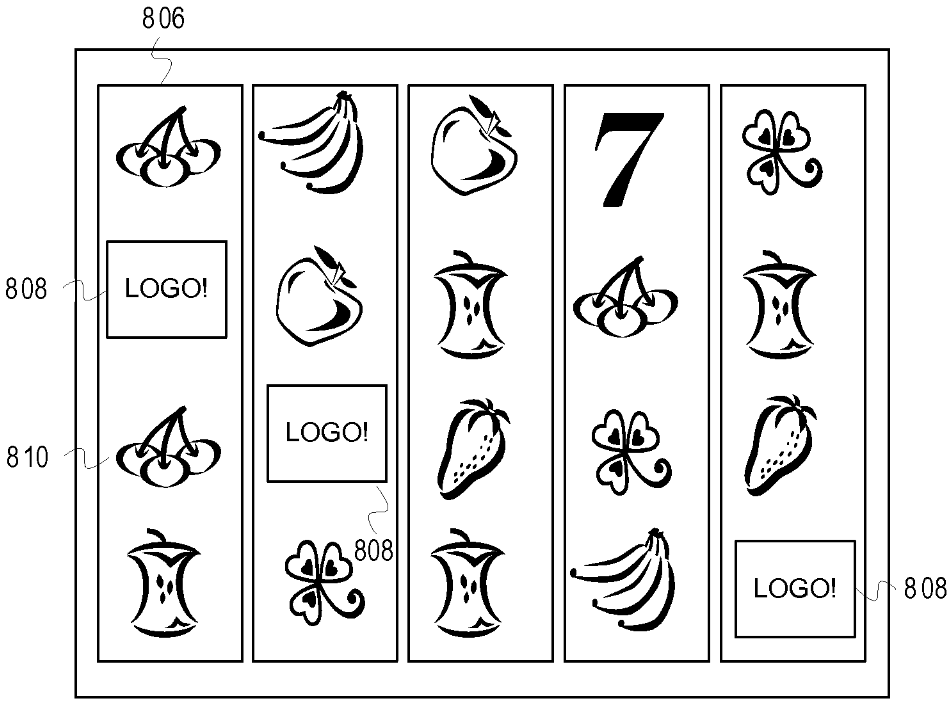
FIG. 8B depicts a portion of an example slot type wagering game composited with slot reel symbols 808 depicting indicia of an advertiser.

FIG. 8B depicts a portion of an example slot type wagering game composited with slot reel symbols 808 depicting indicia of an affiliate advertiser. In some embodiments, the elements of the in-ad game can be modified to depict indicia of the affiliate advertiser. For example, FIG. 8B depicts a slot type wagering game having slot reels 806 and slot reel symbols 810. In FIG. 8B, some of the slot reel symbols 810 have been replaced with slot reel symbols depicting indicia 808 of the affiliate advertiser. In other words, indicia of the affiliate advertiser (e.g., the affiliate advertiser's logo or other trademark) are incorporated in the in-ad game. It is not necessary that the casino-style game of the in-ad game be a slot type game. For example, the in-ad game can include a card game, or any other suitable casino game. In such embodiments, the back of the cards (or other portions of the card) can depict indicia of the affiliate advertiser, such as the affiliate advertiser's logo or other trademarks. In some embodiments, an advertiser server can leverage the user's browsing history and demographic/geographic information to serve an in-ad game tailored to the user's interests. For example, for a user who frequently visits automotive websites, the advertiser server can serve an in-ad game that depicts logos or other indicia of a local automotive dealership.

Figure 9:
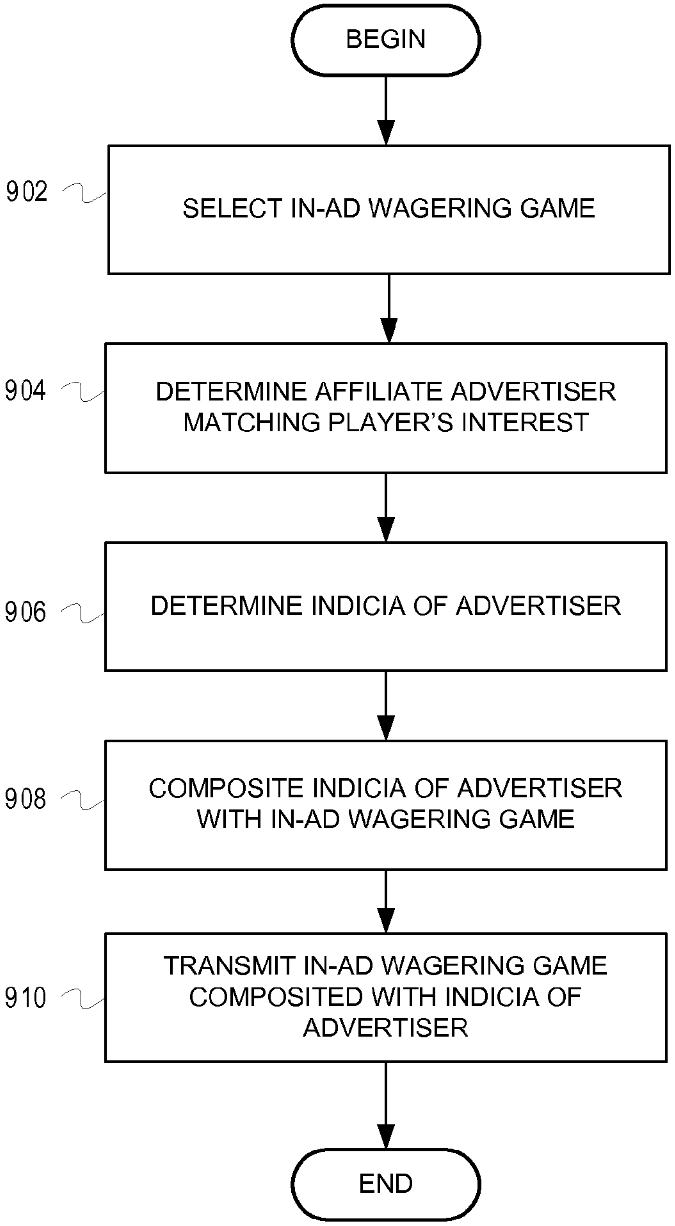
FIG. 9 is a flow diagram illustrating example operations for compositing an in-ad game with indicia associated with an advertiser, according to some embodiments of the inventive subject matter.

FIG. 9 is a flow diagram illustrating example operations for compositing an in-ad game with indicia associated with an affiliate advertiser, according to some embodiments of the inventive subject matter. The in-ad game may include advertising content for a wagering game maker, such as WMS Gaming Inc. The indicia may include advertising content for an affiliate of the game maker. Therefore, the in-ad game may include ad content for two advertisers (i.e., the wagering game maker and the affiliate advertiser). The flow begins at block 902.

At block 902, the advertiser server selects an in-ad game with which to composite indicia associated with an affiliate advertiser. In some embodiments, the in-ad game selection can be based on a user's interests. For example, if the user has a history of playing virtual poker games, the advertiser server can select a virtual poker game to composite with indicia associated with the affiliate advertiser. In some embodiments, the in-ad game selection can be based on characteristics of the indicia to be composited with the in-ad game. For example the indicia to be composited in the in-ad game may be suitable to a slot game. In such embodiments, the operations at blocks 904 and 906 (below) can occur before the operations at block 902. The flow continues at block 904.

At block 904, the advertiser server determines an affiliate advertiser matching the player's interests. Referring to the automotive dealership example from the discussion of FIG. 8B, the advertiser server can determine that a local automotive dealer (Bob's Premium Auto Sales) is an affiliate advertiser matching the player's interests. In other words, Bob's Premium Auto Sales has paid to place advertisements on websites. Based on the user's browsing history, demographic information, geographic information, etc., the advertiser server can determine that serving an advertisement for Bob's Premium Auto Sales to the user would be appropriate. Again (as with the entirety of the specification and drawings), the advertiser server is used by way of example. Any suitable component can make these determinations. For example, in some embodiments, a website, ad network server, etc. can determine a user's interests and/or what advertisements would be appropriate for the user. The flow continues at block 906.

At block 906, the advertiser server determines indicia associated with the advertiser. For example, indicia may include logos, trademarks, etc. of the affiliate advertiser. Referring back to the Bob's Premium Auto Sales example, indicia may include the Bob's Premium Auto Sales logo. The flow continues at block 908.

At block 908, the advertiser server composites the indicia of the advertiser with an in-ad game. For example, if the casino-style game of the in-ad game is a slot type game, the advertiser server can composite the Bob's Premium Auto Sales logo with the in-ad game by using the Bob's Premium Auto Sales logo as a slot reel symbol. The flow continues at block 910.

At block 910, the advertiser server transmits the in-ad game composited with the indicia of the advertiser for presentation on a webpage. For example, the advertiser server transmits the in-ad game with the Bob's Premium Auto Sales logo slot reels for presentation on a webpage so that the user can play the in-ad game.

In some embodiments of the inventive subject matter can awards, badges, coins, points, game elements, and/or functions can be earned and used in later gameplay. For example, a user may earn a badge during gameplay and the badge will be available for use by the user at a later time during subsequent gameplay.

Although examples refer to an advertiser server selecting an appropriate advertisement for a user, in some embodiments other entities can select an appropriate advertisement for the user. For example, the ad network server can store a large number of advertisements from one or more advertisers. Based on the browsing history of the user, the ad network server can choose an appropriate advertisement for the user from the advertisements stored on the ad network server.

Although examples refer to the advertiser server tracking and recording information about the user, in some embodiments, entities other than the advertiser server can engage in this activity. For example, a webpage or website can track users by dropping cookies (or other tracking mechanisms) on the user's local hard disk.

Although examples refer to an in-ad game being a casino-style game, in some embodiments, the in-ad game can contain content other than or in addition to a casino-style game. For example, an entire virtual casino can be contained in the in-ad game. In some embodiments, a user can interact with the virtual casino using an avatar. Using the avatar, the user can traverse the virtual casino floor, socialize with other user's avatars, play virtual wagering games, etc. In essence, the virtual casino can be a two-dimensional or three-dimensional world with which the user can interact. Additionally, in the in-ad game can include all elements of a wagering game that are available on a wagering game machine in a casino.

Although examples refer to persistent gameplay of an in-ad game from website to website, the operations described herein are applicable from webpage to webpage. For example, a user can begin an in-ad game on a first webpage associated with a first website and continue play of the in-ad game on a second webpage associated with the first website. Additionally, the user can continue play of the in-ad game on a third webpage associated with a second website, and so on and so forth.

In some embodiments, casino-style game outcomes are centrally determined. For example, a server associated with the social gaming website determines the outcomes of the casino-style games. This applies to casino-style games played on the social gaming website as well as casino-style games played as in-ad games on other webpages/websites. Alternatively, in some embodiments, the casino-style game outcomes can be determined by an entity that is not associated with the social gaming website. For example, an advertising network server can determine the casino-style game results for the in-ad games. Additionally, the social gaming site may be a social networking site to which casino-style games are ancillary. In such embodiments, the casino-style game outcomes can be determined by servers associated with the casino-style game provider.

In some embodiments, users can obtain certain prizes, awards, achievements, etc. for casino-style games on the social gaming website by participating with an advertiser. For example, in order to unlock a new level, a user may be required to go to visit an advertiser's webpage and provide an email address. Upon completion of this task, the new level will be available to the user via the social gaming website and/or in-ad games.

Wagering Game Networks

Some embodiments of the inventive subject matter reside in wagering game networks.

Figure 10:
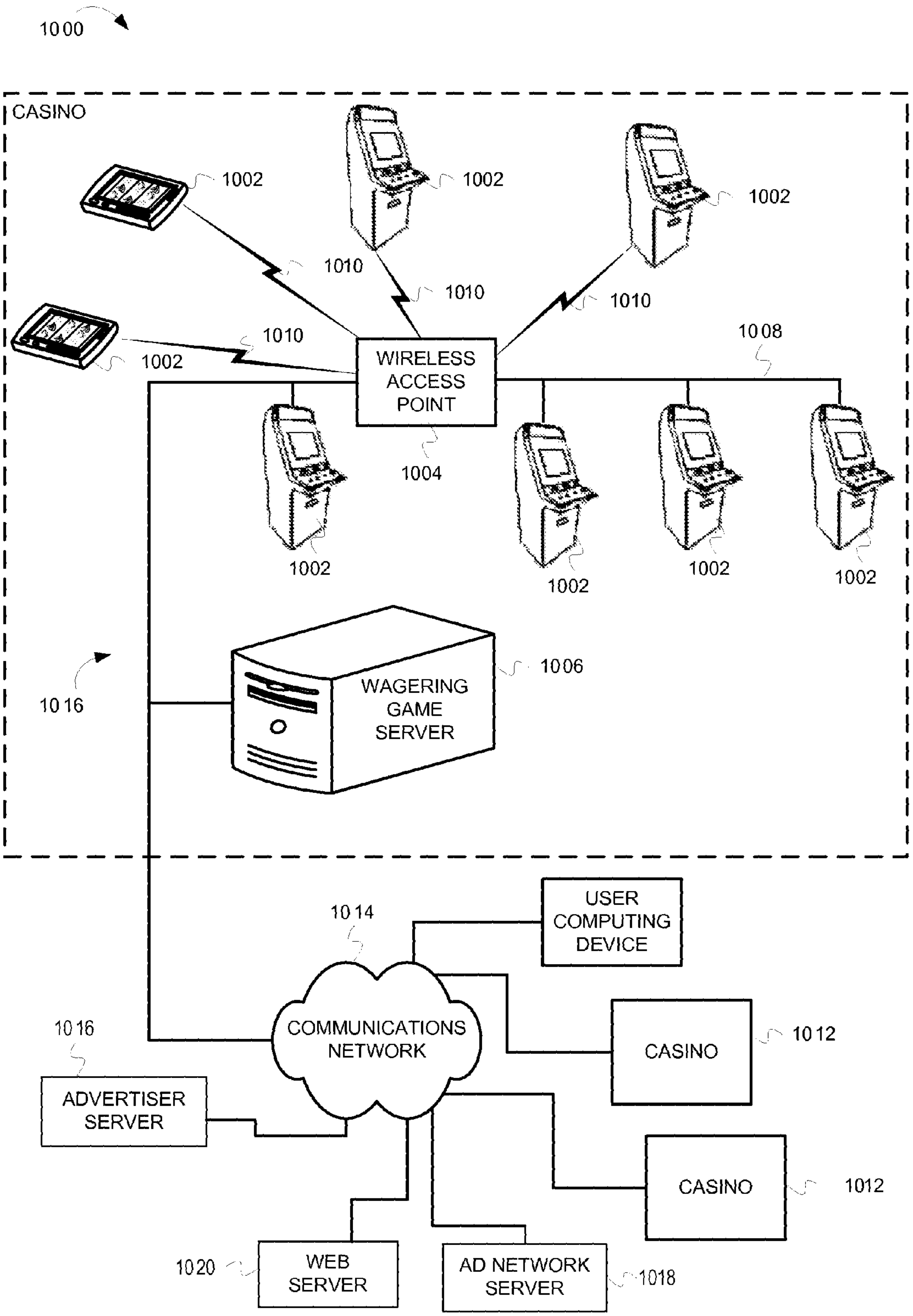
FIG. 10 is a block diagram illustrating a wagering game network 800, according to example embodiments of the invention.

FIG. 10 is a block diagram illustrating a wagering game network 1000, according to example embodiments of the invention. As shown in FIG. 10, the wagering game network 1000 includes a plurality of casinos 1012 connected to a communications network 1014.

Each casino 1012 includes a local area network 1016, which includes an access point 1004, a wagering game server 1006, and wagering game machines 1002. The access point 1004 provides wireless communication links 1010 and wired communication links 1008. The wired and wireless communication links can employ any suitable connection technology, such as Bluetooth, 802.11, Ethernet, public switched telephone networks, SONET, etc. In some embodiments, the wagering game server 1006 can serve wagering games and distribute content to devices located in other casinos 1012 or at other locations on the communications network 1014.

The wagering game machines 1002 described herein can take any suitable form, such as floor standing models, handheld mobile units, bartop models, workstation-type console models, etc. Further, the wagering game machines 1002 can be primarily dedicated for use in conducting wagering games, or can include non-dedicated devices, such as mobile phones, personal digital assistants, personal computers, etc. In one embodiment, the wagering game network 1000 can include other network devices, such as accounting servers, wide area progressive servers, user tracking servers, and/or other devices suitable for use in connection with embodiments of the invention.

In some embodiments, wagering game machines 1002 and wagering game servers 1006 work together such that a wagering game machine 1002 can be operated as a thin, thick, or intermediate client. For example, one or more elements of game play may be controlled by the wagering game machine 1002 (client) or the wagering game server 1006 (server). Game play elements can include executable game code, lookup tables, configuration files, game outcome, audio or visual representations of the game, game assets or the like. In a thin-client example, the wagering game server 1006 can perform functions such as determining game outcome or managing assets, while the wagering game machine 1002 can present a graphical representation of such outcome or asset modification to the user (e.g., player). In a thick-client example, the wagering game machines 1002 can determine game outcomes and communicate the outcomes to the wagering game server 1006 for recording or managing a user's account.

In some embodiments, either the wagering game machines 1002 (client) or the wagering game server 1006 can provide functionality that is not directly related to game play. For example, account transactions and account rules may be managed centrally (e.g., by the wagering game server 1006) or locally (e.g., by the wagering game machine 1002). Other functionality not directly related to game play may include power management, presentation of advertising, software or firmware updates, system quality or security checks, etc.

Any of the wagering game network components (e.g., the wagering game machines 1002) can include hardware and machine-readable media including instructions for performing the operations described herein.

Additionally, an advertiser server 1016, ad network server 1018, and web server 1020 are connected to the communications network 1014. The advertiser server can communicate with an ad network server 1018 and a web server 1020 to facilitate the operations described herein. The servers 1016, 1018, and 1020 can perform any of the operations described herein. In some embodiments, the wagering game server 1006 can perform all or a subset of the operations described herein. For example, the wagering game server 1006 may perform operations shown in FIGS. 2, 6, 7 and 9.

GENERAL COMMENTS

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

presenting, via a social gaming website, a gaming session including casino-style games, wherein the gaming session is associated with a user profile;

electronically recording in a memory storage device, in association with the user profile, information about the casino-style games during the gaming session;

detecting an electronic request for an in-advertisement casino-style game, wherein the in-advertisement casino-style game will appear on a webpage on a second website;

electronically transmitting, via a network for presentation on the webpage as part of the in-advertisement casino-style game, first content configured to request information identifying the user profile;

receiving, via a network interface device, the information identifying the user profile; and electronically transmitting, via the network for presentation on the webpage as part of the in-advertisement casino-style game, second content including data to resume play of the gaming session via the in-advertisement casino-style game, and wherein the data is based on the information about the casino-style games.

2. The method of claim 1, wherein play of the gaming session via the in-advertisement casino-style game allows a user access to a version of the social gaming website.

3. The method of claim 1, further comprising:

determining results for one or more of the casino-style games on the social gaming website and the in-advertisement casino-style game; and determining, based on the results, an award for a user.

4. The method of claim 1, further comprising:
recording information during play of the in-advertisement casino-style game, wherein the information about the in-advertisement casino-style game is for use in extending the gaming session back to the social gaming website.

5. The method of claim 1 further comprising automatically selecting the second content in response to automatically associating the information identifying the user profile with the information about the casino-style games recorded during the gaming session.

6. An apparatus comprising:
at least one processor, and
a memory storage device configured to store computer usable program code executable on the at least one processor, the computer usable program code including code to:
receive a request from a website for an in-advertisement game;
electronically transmit, via a communications network for presentation on the website, the in-advertisement game;
record game state information during play of the in-advertisement game, wherein the game state information affects a casino-style game on a social gaming website; and
prompt, via the in-advertisement game, input of login credentials associated with a player account.

7. The apparatus of claim 6, said computer usable program code further including code to:
receive the login credentials; and
associate the game state information with the player account.

8. The apparatus of claim 6, said computer usable program code further including code to:
determine that the login credentials have not been received; and
in response to determining that the login credentials have not been received, prompt registration with the social gaming website.

9. The apparatus of claim 6, said computer usable program code further including code to:
determine a result of the in-advertisement game;
determine an award based on the result of the in-advertisement game; and
associate the award with the player account.

10. The apparatus of claim 6, said computer usable program code further including code to:
receive, from a user via the social gaming website, the login credentials;
determine, from the game state information from the in-advertisement game, progress of the user in the casino-style game; and
present, on the social gaming website, the casino-style game for continued play by the user.

11. The apparatus of claim 6, wherein the game state information affects the casino-style game on the social gaming website by one or more of: enabling continued play of the in-advertisement game on the social gaming website, enabling a badge indicating an achievement, indicating progress through a thematic episode, transferring a credit meter to the social gaming website, indicating game levels or games that have been unlocked, or indicating virtual currency won in the in-advertisement game.

12. The apparatus of claim 6, wherein the player account is associated with the social gaming website, and said computer usable program code further including code to:
associate the game state information with the player account.

13. A method comprising:
detecting an electronic request for a first advertisement;
identifying a user associated with the request for the first advertisement;
electronically transmitting, via a communications network for presentation on a first webpage, content for presenting the first advertisement, wherein the first advertisement includes an in-advertisement game configured to award value to the user;
automatically recording, in a memory storage device, game states of the in-advertisement game as the user plays the in-advertisement game on the first webpage;
detecting an electronic request for a second advertisement;
determining that the user is associated with the electronic request for the second advertisement; and
electronically transmitting, via the communications network for presentation on a second webpage, content for presenting the second advertisement, wherein the second advertisement includes the in-advertisement game, and wherein the content for presenting the second advertisement includes at least one of the game states to resume the in-advertisement game on the second webpage.

14. The method of claim 13, wherein the identifying the user includes one of inspecting a tracking cookie, determining an internet protocol address associated with the user, determining a geographic location of the user, and determining a media access control address associated with the user.

15. The method of claim 13, wherein the first webpage originates from a first website and the second webpage originates from a second website, and wherein an advertising network has access to data files created by the first website and the second website, wherein the data files include information about the user.

16. The method of claim 13, further comprising:
prompting the user to resume play of the in-advertisement game on the second webpage; and
detecting user input for the in-advertisement game on the second webpage.

17. The method of claim 13, further comprising:
determining a result of the in-advertisement game; and
recording the result of the in-advertisement game in a player data file associated with the user, wherein the player data file affects games on a social gaming website.

18. The method of claim 13, further comprising:
prompting the user to login to an account via the first webpage;
accessing information about the user and the account;
determining the value, based at least in part on the information about the user; and
delivering the value to the user based on results of the in-advertisement game.

19. A method comprising:
determining an identity of a user, wherein the determining the identity of the user is based, at least in part, on electronically analyzing a data file containing information about the user;
determining information about interests of the user, wherein the determining the information about the interests of the user is based, at least in part, on the electronically analyzing the data file containing information about the user;

automatically determining, by an electronic processor, based on the information about the interests of the user, an in-advertisement game for the user, wherein the in-advertisement game is part of an advertisement, and wherein the in-advertisement game is configured to award value to the user; and electronically transmitting the in-advertisement game for play by the user on a webpage originating from a website.

20. The method of claim 19, wherein the data file includes login information associated with the website and the user.

21. The method of claim 19, wherein the data file includes login information associated with another website and the user.

22. The method of claim 19, further comprising:

modifying the in-advertisement game by modifying one or more of a theme of the in-advertisement game, an award of the in-advertisement game, and game elements of the in-advertisement game.

23. The method of claim 19, wherein the determining, based on the information about the interests of the user, the in-advertisement game for the user includes:

determining an advertiser to associate with the in-advertisement game;

determining graphical indicia associated with the advertiser; and modifying the in-advertisement game to include the graphical indicia associated with the advertiser.

24. One or more non-transitory, machine-readable storage devices having instructions stored therein, which, when executed by one or more processors, cause the one or more processors to perform operations that comprising:

presenting, via a social gaming website, a gaming session including casino-style games, wherein the gaming session is associated with a user profile;

recording, in association with the user profile, information about the casino-style games during the gaming session;

electronically detecting an electronic request for an in-advertisement casino-style game, wherein the in-advertisement casino-style game will appear on a webpage on a second website;

electronically transmitting, by a network interface device, via a network for presentation on the webpage as part of the in-advertisement casino-style game, first content configured to request information identifying the user profile;

receiving the information identifying the user profile; and electronically transmitting, via the network, for presentation on the webpage as part of the in-advertisement casino-style game, second content including data to resume play of the gaming session via the in-advertisement casino-style game, wherein the data is based on the information about the casino-style games.

25. The one or more non-transitory, machine-readable storage devices of claim 24, wherein play of the gaming session via the in-advertisement casino-style game allows the user access to a version of the social gaming website.

26. The one or more non-transitory, machine-readable storage devices of claim 24, said operations further comprising:

recording information during play of the in-advertisement casino-style game, wherein the information about the in-advertisement casino-style game is for use in extending the gaming session back to the social gaming website.

* * * * *